April 28, 1936. A. Y. DODGE 2,039,148
REACTANCE CLUTCH
Filed April 20, 1931
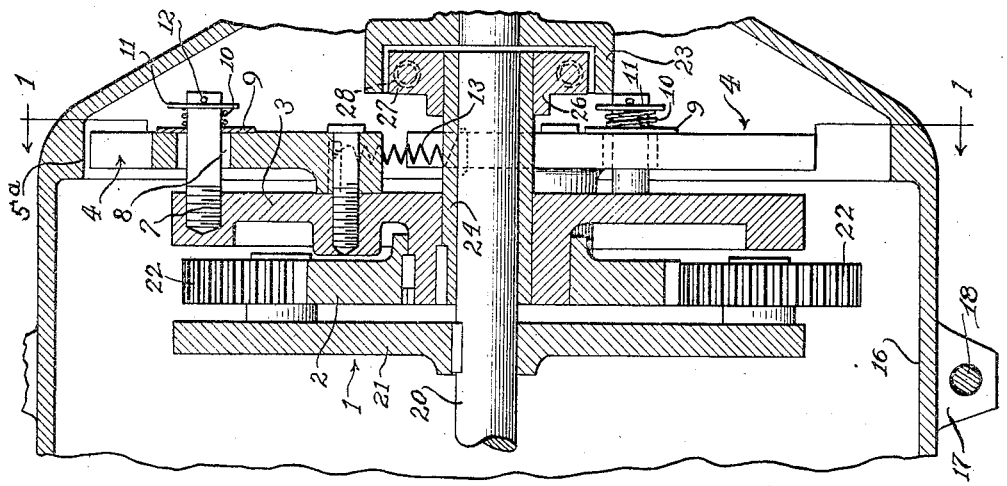
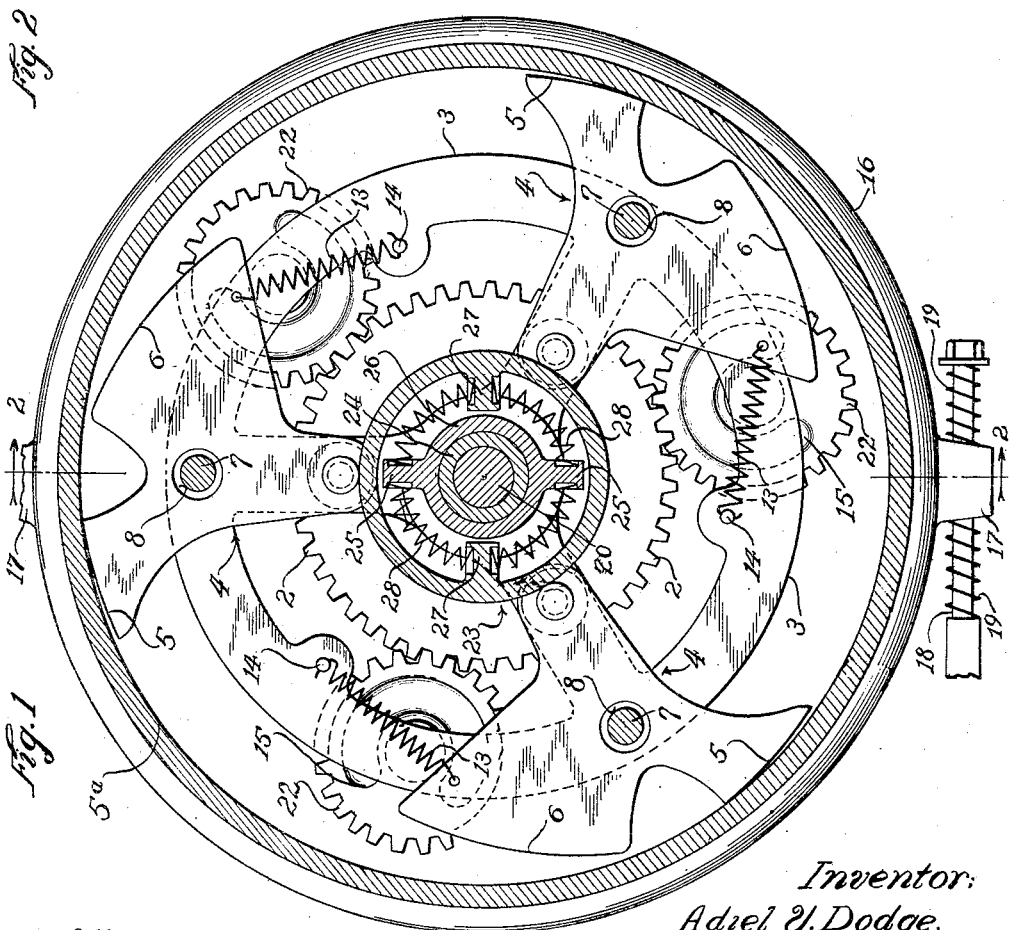
Inventor:
Adiel Y. Dodge.
By: Jones, Addington, Ames & Seibold
Attys.
Witness:
R B Davison Patented Apr. 28, 1936

2,039,148

UNITED STATES PATENT OFFICE 2,039,148

REACTANCE CLUTCH

Adiel Y. Dodge, South Bend, Ind.

Application April 20, 1931, Serial No. 531,497

12 Claims. (Cl. 188—81)

This invention relates to a reactance clutch construction.

One of the objects of my invention is to provide an improved one-way reactance clutch construction which will be smooth in operation.

A further object is to provide such a construction having centrifugal force means for preventing the clutch from having any retarding effect at higher speeds.

A further object is to provide an arrangement to cause the quick release upon the initiation of the positive impulse and a quick engagement of the locking means upon the first part of a negative impulse.

A further object is to provide such a construction in which an oscillatable friction member is provided having provisions for limiting and damping the oscillations.

Further objects will appear from the description and claims.

In the drawing, in which an embodiment of my invention is shown,

Figure 1 is a vertical, transverse section on the line 1—1 of Fig. 2; and

Fig. 2 is an axial section substantially on the line 2—2 of Fig. 1.

Referring to the drawing in detail, the construction shown therein comprises a centrifugal pick-up planetary gear mechanism 1 which will exert alternating oppositely acting impulses on a driven sun gear 2 and a one-way reactance clutch construction comprising a disc 3 rotatable with the sun gear 2 and subject to said alternating oppositely acting impulses, having provisions for nullifying the impulses in one direction while permitting impulses in the other direction to be effective, said provisions comprising a plurality of pivoted one-way dogs 4, each having an arcuate friction surface 5 for engagement with a circular friction surface 5a and each being provided with a counterweight 6 which, as the speed of rotation of the disc 3 on which the dogs are pivoted increases, will cause the dogs to move to a position in which their arcuate surfaces will not frictionally engage the circular friction surface, so that at high speeds these friction dogs 4 have no retarding effect on the rotation of the disc 3. Means are provided for positively limiting the oscillatory movement of each of the pivoted dogs or shoes, such as a pin 7 threaded into the disc 3 and extending through a hole 8 in the shoe slightly larger than the pin. This construction will prevent excessive movement of the shoes. In order to damp the oscillation of the shoe, a friction drag is provided comprising a friction washer 9 surrounding the pin 7 and frictionally engaging the side of the shoe. This washer is pressed against the side of the shoe by means of a coil compression spring 10 surrounding the pin and held in place by means of a retaining washer 11 and cotter pin 12. In order to insure prompt engagement of the shoe with the circular friction surface immediately upon the reception of a reversely acting impulse, a coil tension spring 13 is provided, one end of which is secured to the front of the shoe and the other end of which is secured to the disc at 14.

The center of mass of the balance weight is so located that the impulses affect the mass due to inertia, to create a quick release and vice versa. These weights, therefore, are affected by change in angular velocity in addition to the effect of the centrifugal force.

The impulse effect is obtained in the construction shown by counterweighting the planet gear, as indicated at 15, so that centrifugal force will cause the planet gear to resist a movement bringing the weighted side of the gear toward the center and so that the counterweight will cause the gear to assist in an action causing the counterweights to move away from the axis of rotation.

In some cases, I find it desirable to mount the casing 16 on which the circular friction surface is formed in such a manner as to permit a cushioned oscillatory movement of this casing to cushion the effect of the oppositely acting impulses. For this purpose, I may provide the casing with a pair of oppositely disposed lugs 17 through which a spring supporting pin 18 extends freely, each of these pins extending through a pair of coil compression springs 19 which will cushion the oscillatory movement of the casing in both directions.

In operation, as the driving shaft 20 is rotated, it carries with it the disc 21 on which the counterweighted planet gears 22 are mounted. These planet gears meshing with the driven sun gear 2 exert alternating oppositely acting impulses thereon which are transmitted to the disc 3 carrying the one-way reactance clutch dogs 4. These dogs nullify the counterclockwise impulses (as viewed in Fig. 1) but permit the clockwise impulses to be effective. The integration of these clockwise impulses results in a clockwise rotation of the dog-carrying disc 3, this clockwise rotation increasing in speed until the disc 3 is rotating at the same speed as the planet gear carrier 21. As the speed increases, centrifugal force will move the dogs to a position in which their arcuate friction surfaces 5 will no longer engage the circular friction surface 5a on the casing 16 so that there is no drag on the free rotation of the disc. The cushion mounting for the casing smooths out the action of the pulsating impulses, thus preventing jerkiness in the driven member.

In order to smooth out still further the action of the driven member 23, a cushioning transmission construction may be provided between the sleeve 24, on which the disc 3 is mounted, and the driven member 23. This cushioning transmission as shown comprises a pair of vanes 25 extending outwardly from the hub 26 mounted on the sleeve, a pair of vanes 27 extending inwardly from the rim of the driven member 23 and a plurality of compression springs 28 positioned between the inwardly and outwardly extending vanes.

In order to secure the proper engagement between the arcuate friction surface 5 of the shoe and the circular friction surface 5a of the casing, the arcuate surface is relieved slightly so that the rear end of the friction surface 5 is spaced slightly from the circular friction surface 5a, this relief, however, being so slight that when the shoe is called upon to resist a reversely-acting impulse, the entire arcuate surface of the shoe will be brought into engagement with the circular friction surface of the casing.

It will be noticed that the curvature of the shoes is not quite parallel to the surface which they contact. The heel is purposely made to come in contact first. The toe comes in contact later, but only after a slight deflection of the shoe and ring takes place. By this means a high factor of self-actuation is secured at the first part of the locking action and later followed by contact toward the toe, having less self-actuation but affording a substantial contact surface at a point less apt to be crowded by the center. In this way I make use of the deflections which take place in the ring and in the shoe to accomplish the desired end of a high degree of self-actuation at the start of contact, gradually changing into a more usable contact angle immediately after contact.

While only one specific embodiment of the present invention has been shown and described herein, it will be understood that various changes and modifications in the details of structure and arrangement of the parts may be made without departing from the spirit and scope of the invention. This embodiment of the invention having been shown and described, therefore, what is claimed as new is:

1. A one-way reactance clutch construction comprising a rotatable member having associated therewith driving means for subjecting it to alternating oppositely acting impulses and having provisions for nullifying the impulses in one direction while permitting the impulses in the other direction to be effective, said provisions comprising a member pivotally mounted on said rotatable member so that its center of gravity lies outside a plane passing through its pivot point and perpendicular to a radius from the center of the rotatable member passing through said pivot point, and a member held from rotation and provided with a circular friction surface with which said second member has a frictional wrapping and self-energizing engagement over a considerable area permitting free rotation of the rotatable member in one direction but preventing reverse rotation.

2. A one-way reactance clutch construction comprising a rotatable member having associated therewith means for subjecting it to alternating oppositely acting impulses and having provisions for nullifying the impulses in one direction while permitting the impulses in the other direction to be effective, said provisions comprising a member anchored on said rotatable member, a member held from rotation and provided with a circular friction surface with which said anchored member has a frictional self-energizing surface engagement permitting free rotation of the rotatable member in one direction but preventing reverse rotation, and energy-absorbing means for damping the movements of said anchored member.

3. A one-way reactance clutch construction comprising a rotatable member having driving means associated therewith for subjecting it to alternating oppositely acting impulses and having provisions for nullifying the impulses in one direction while permitting the impulses in the other direction to be effective, said provisions comprising a member movably anchored on said rotatable member, a member provided with a circular friction surface with which said anchored member has a frictional self-energizing surface engagement permitting free rotation of the rotatable member in one direction but preventing reverse rotation, means for limiting the movement of the anchored member, and energy-absorbing means for damping the movements of said anchored member.

4. A one-way reactance clutch construction comprising a rotatable member having associated therewith driving means subjecting it to alternating oppositely acting impulses and having provisions for nullifying the impulses in one direction while permitting the impulses in the other direction to be effective, said provisions comprising a member oscillatably mounted on said rotatable member, and a member provided with a circular friction surface with which said oscillatable member has a frictional self-energizing direct surface engagement permitting free rotation of the rotatable member in one direction but preventing reverse rotation, said oscillatable member having its center of mass forward in the direction in which rotation is permitted of the radial plane through its axis of oscillation whereby centrifugal force will cause the oscillatable member to move out of contact with the circular friction surface as the speed increases, and said oscillatable member also having its center of mass outward of a plane passing through its axis of oscillation perpendicular to a radius through said axis from the axis of said rotatable member whereby the mass inertia of the oscillatable member will throw it into or out of engagement with said friction surface when accelerated by reversely or forwardly acting impulses respectively.

5. A one-way reactance clutch construction comprising a rotatable member having associated therewith driving means subjecting it to alternating oppositely acting impulses and having provisions for nullifying the impulses in one direction while permitting the impulses in the other direction to be effective, said provisions comprising a member oscillatably mounted on said rotatable member, a member provided with a circular friction surface with which said oscillatable member has a frictional self-energizing direct surface engagement permitting free rotation of the rotatable member in one direction but preventing reverse rotation, and means for limiting the oscillatory movement of the oscillatable member, said oscillatable member having its center of mass forward in the direction in which rotation is permitted of the radial plane through its axis of oscillation whereby centrifugal force will cause the oscillatable member to move out of contact with the circular friction surface as the speed increases and said oscillatable member also having its center of mass outward of a plane passing through its axis of oscillation perpendicular to a radius through said axis from the axis of said rotatable member whereby the mass inertia of the oscillatable member will throw it into or out of engagement with said friction surface when accelerated by reversely or forwardly acting impulses respectively 6. A one-way reactance clutch construction comprising a rotatable member having associated therewith driving means subjecting it to alternating oppositely acting impulses and having provisions for nullifying the impulses in one direction while permitting the impulses in the other direction to be effective, said provisions comprising a member oscillatably mounted on said rotatable member, a member provided with a circular friction surface with which said oscillatable member has a frictional self-energizing direct surface engagement permitting free rotation of the rotatable member in one direction but preventing reverse rotation, and energy-absorbing means for damping the oscillations of said oscillatable member, said oscillatable member having its center of mass in front of the radial plane through its axis of oscillation whereby centrifugal force will cause the oscillatable member to move out of contact with the circular friction surface as the speed increases.

7. A one-way reactance clutch construction comprising a rotatable member having associated therewith driving means subjecting it to alternating oppositely acting impulses and having provisions for nullifying the impulses in one direction while permitting the impulses in the other direction to be effective, said provisions comprising a member oscillatably mounted on said rotatable member, a member provided with a circular friction surface with which said oscillatable member has a frictional self-energizing direct surface engagement permitting free rotation of the rotatable member in one direction but preventing reverse rotation, means for limiting the oscillatory movement of the oscillatable member, and energy-absorbing means for damping the oscillations of said oscillatable member, said oscillatable member having its center of mass in front of the radial plane through its axis of oscillation whereby centrifugal force will cause the oscillatable member to move out of contact with the circular friction surface as the speed increases.

8. A one-way reactance clutch construction comprising a rotatable member having associated therewith driving means subjecting it to alternating oppositely acting impulses and having provisions for nullifying the impulses in one direction while permitting the impulses in the other direction to be effective, said provisions comprising a member oscillatably mounted on said rotatable member, and a member provided with a circular friction surface with which said oscillatable member has a frictional self-energizing direct surface engagement permitting free rotation of the rotatable member in one direction but preventing reverse rotation, said friction surface member being oscillatably mounted and having means for cushioning its oscillatory movement.

9. A one-way reactance clutch construction comprising a rotatable member having associated therewith driving means subjecting it to alternating oppositely acting impulses and having provisions for nullifying the impulses in one direction while permitting the impulses in the other direction to be effective, said provisions comprising a member oscillatably mounted on said rotatable member, and a member provided with a circular friction surface with which said oscillatable member has a frictional self-energizing direct surface engagement permitting free rotation of the rotatable member in one direction but preventing reverse rotation, said friction surface member being oscillatably mounted, and having means for cushioning its oscillatory movement in both directions.

10. A one-way reactance clutch comprising a rotatable member having associated therewith driving means subjecting it to alternating oppositely acting impulses of force, shoes pivoted thereon, said shoes having a circular friction surface arranged to contact a smooth stationary ring, said shoes being pivoted on said rotatable member in a circle located more closely to the center than to the friction surface and having a counterweight thereon located more closely to the friction surface than to the center in order to effect a quick release and a quick engagement due to the action of impulse on the mass of said counterweight as well as to have the centrifugal force acting on said counterweight cause a disengagement, and friction damping means for controlling the movement of said shoes.

11. A one-way reactance clutch construction comprising a rotatable member having associated therewith driving means for subjecting it to alternating oppositely acting impulses and having provisions for nullifying the impulses in one direction while permitting the impulses in the other direction to be effective, said provisions comprising a member pivotally mounted on said rotatable member so that its center of gravity lies outside a plane passing through its pivot point, and perpendicular to a radius from the center of the rotatable member passing through said pivot point, a member held from rotation and provided with a circular friction surface with which said second member has a frictional wrapping and self-energizing engagement over a considerable area permitting free rotation of the rotatable member in one direction but preventing reverse rotation, and energy absorbing means for damping the movements of said second member.

12. A one-way reactance clutch comprising a rotatable member having associated therewith driving means subjecting it to alternating oppositely acting impulses, a smooth stationary ring coaxial with said rotatable member and shoes pivoted near the periphery of said rotatable member, said shoes having arcuate friction surfaces slightly eccentric to said ring and adapted to engage said ring and prevent rotation of said member in one direction while permitting rotation in the other direction, the center of gravity of each shoe being so disposed that the couple comprising a reversely acting impulse imparted to the shoe at its pivot point and the mass inertia force of the shoe tends to swing the shoe into engagement with the ring and conversely, the couple comprising a forwardly acting impulse and the mass inertia force of the shoe tends to swing the shoe out of engagement with the ring.

ADIEL Y. DODGE.